Aug. 26, 1947.  G. C. BRECKNER ET AL  2,426,432
CHILD'S VEHICLE
Filed May 7, 1945  2 Sheets-Sheet 2
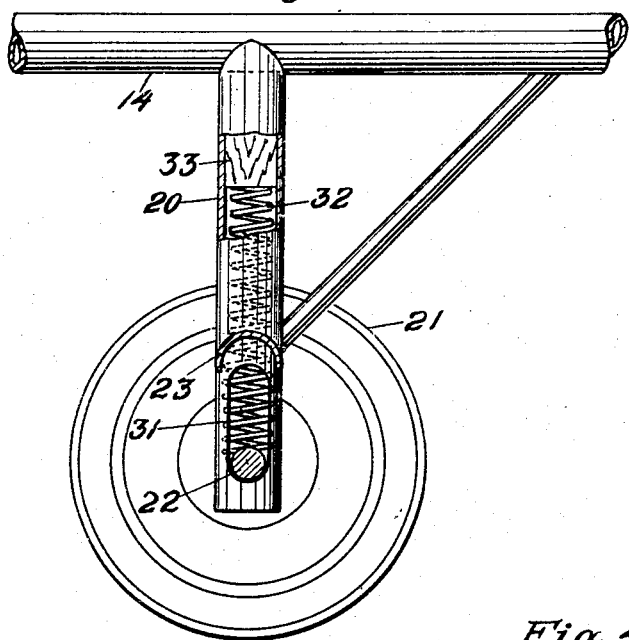
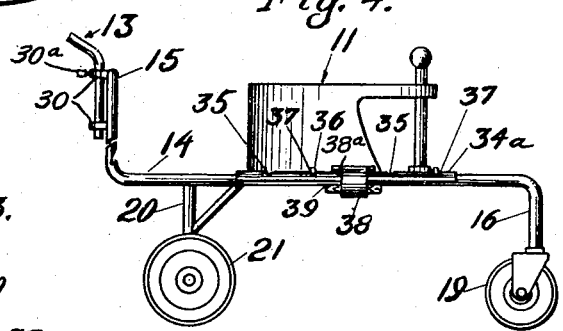
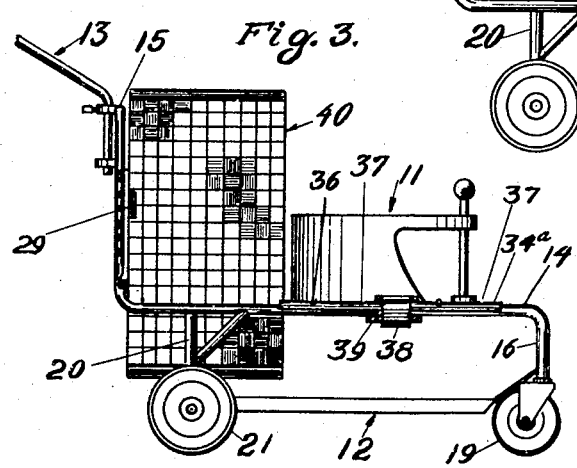
INVENTORS
G. C. BRECKNER and
E. F. ROBINSON
BY
ATTORNEY.

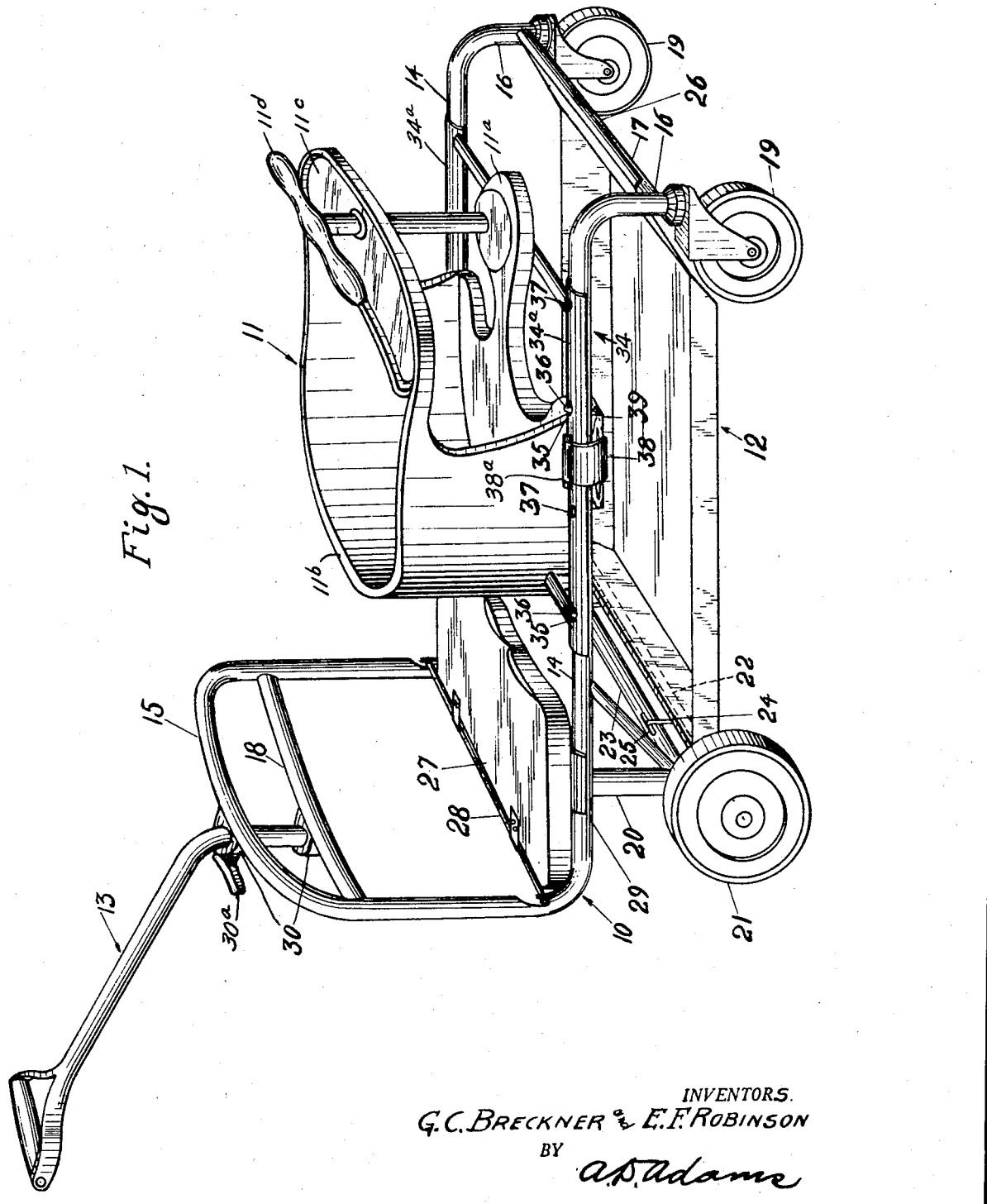

Patented Aug. 26, 1947

2,426,432

UNITED STATES PATENT OFFICE 2,426,432

CHILD'S VEHICLE

Gary C. Breckner, Beverly Hills, and Elliott F. Robinson, Long Beach, Calif.

Application May 7, 1945, Serial No. 592,316

4 Claims. (Cl. 280—7.10)

This invention relates to a child's vehicle and, among other objects, aims to provide an improved child's vehicle for use as a stroller or go-cart and which may be readily converted to a child's walker. A very important aim is to provide, in such a vehicle, an improved tubular and plastic construction which is sturdy, simple and relatively inexpensive and which, at the same time, is aesthetically attractive and utilitarian. A further important object is to provide such a vehicle having two principal sub-assemblies, namely: a chassis and a removable seat unit, the latter being attachable to the chassis in two alternative positions for the attainment of many advantages, as will appear more fully hereinafter. Another aim is to provide an improved child's vehicle which can be used as a stroller for two small children, or one child and a market basket or the like. Still another important aim is to provide a greatly improved wheel suspension for a vehicle of the character described. A further object is to provide an improved floor-pan or foot-board in a child's vehicle of this type. Another object is to provide a handle of improved construction and arrangement for propelling such a vehicle.

Other aims and advantages of the invention will be apparent in the following description of one embodiment thereof, as illustrated in the accompanying drawings, wherein:

Fig. 1 is a perspective view of a child's vehicle in accordance with the invention, showing the straddle seat in forward position and the rumble seat down;

Fig. 2 is an enlarged detail view of one of the rear wheels and suspension therefor;

Fig. 3 is a schematic side elevation of the vehicle of Fig. 1, showing the rumble seat raised and a container mounted in the vehicle; and Fig. 4 is a view similar to Fig. 3, showing the straddle seat in rearward position with the floor-pan removed.

Referring particularly to Fig. 1, the vehicle includes a wheeled chassis 10 and a straddle seat unit 11. There is also provided a removable floor-pan 12 and a removable propulsive handle 13.

The bed of the chassis is formed from a single length of tubular or pipe stock by bending operations and has a pair of elevated, longitudinal side members 14, which are horizontal and parallel, an upright back 15, and vertically depending front legs 16. A forward cross member 17, preferably of tubular stock, is welded or otherwise suitably secured between front legs 16. A similar back cross member 18 is provided at the rear.

The front of the vehicle is supported by a pair of caster wheels 19 mounted on the front legs 16. Preferably, such wheels are provided with ball or other anti-friction bearings (not shown) at the axle and swivel.

Near the rear of the longitudinal frame members 14, a pair of vertically depending rear legs 20 is provided. The rear of the vehicle is supported by rear wheels 21 carried by axle 22 and suspended in a manner to be explained with greater particularity hereinafter. Spanning the distance between the rear legs 20 is a rear cross brace 23 formed from half-tubular stock.

The floor-pan 12 is slung between the rear cross brace 23 and the front cross member 17 and is supported at the rear by means of hooks 24 engaged in slots 25 cut through the top of the rear cross brace. At the front, the edge of the floor-pan is turned over at 26 to engage and rest upon the front cross member.

The rumble seat 27 is shown as being in the form of a substantially rectangular board having a shaft 28 suitably secured to its rear edge and pivotally mounted in the vertical runs of the back frame member 15. The pivotal mounting may be of any suitable form to permit the seat to be removed. The seat is shown as having curved end brackets 29 resting upon the opposite side members 14 of the chassis. The seat is adapted to be swung up to a substantially vertical position to permit the front seat to be adjusted to its rearward position.

The propulsive handle 13 is removably affixed in vertically aligned, upper and lower socket members 30, mounted on the back frame member 15 and back cross member 18, respectively, and is maintained therein by a conventional thumb screw 30a. The handle projects rearwardly from the vehicle at a rather large angle to provide better leverage for negotiating curbs or other obstacles.

Referring, now, to Fig. 2, showing the left rear wheel from a point near the center of the vehicle (axle 22 and rear cross brace 23 being shown in section) it will be seen that a vertically elongated slot 31, having rounded upper and lower ends, is cut through the rear leg 20 near its lower end. Through the slot the axle 22 passes. Inside the tubular leg 20, a helical compression spring 32 is positioned, the bottom of the spring resting upon the axle 22 and the top of the spring bearing against the bottom surface of a wooden plug 33. It will be understood that a similar type of wheel suspension is provided on the other side of the vehicle, the axle 22 extending across the vehicle and supporting both wheels. This arrangement is of the utmost simplicity, yet, furnishes a very effective spring suspension for the rear wheels.

The straddle seat 11 has the usual seat proper and forwardly projecting straddle bar 11a. Also, the conventional back 11b, tray 11c and handle 11d are provided. Preferably, the seat, back and tray are molded from plastic material and the handle and its upright portion may be similarly formed. The straddle seat has a supporting frame 34 made of metal parts welded together, including a pair of side members 34a formed from half-tubular stock and front and rear transverse members 34b, 34c extending between the side members 34a. The side members 34a rest upon the longitudinal chassis members 14, thus supporting the seat unit. The side members are provided with four holes 35 cooperating with four pins 36 on the chassis members 14 to fix the seat unit in its forward position. A second set of four holes 37 are cut in the side members for positioning the seat unit in its rearward position in cooperation with the pins 36, as described more fully hereinafter.

To prevent the straddle seat unit from jostling off the pins and out of the desired position, a clamp 38 is attached to each side member 34a by means of a spring hinge 38a. The bottom of the clamp has a block 39 engaging the underside of the frame member 14. The spring hinges 38a resiliently urge the clamps 38 downwardly and inwardly about the hinge pivots, thereby holding the blocks 39 in tight engagement with the underside of the frame member 14, the clamps 38, spring hinges 38a and blocks 39 forming resiliently mounted clamping means. The blocks may readily be grasped by the fingers for opening the clamps when it is desired to remove or reposition the seat unit.

To use the vehicle as a stroller or go-cart for two children, it is arranged as shown in Fig. 1. The smaller child is seated in the straddle seat and the larger child occupies the rumble seat. It will be observed that the floor-pan will accommodate the feet of both children, the floor sloping upwardly in front to receive the feet of the child seated in the straddle seat and extending rearwardly under the rumble seat so that the child occupying the latter may rest his feet comfortably on the floor-pan. The sides of the pan are turned up to prevent a child's foot from slipping off the floor and contacting the ground during movement of the vehicle. The floor-pan may be made of plastic or light gauge metal.

As shown in Fig. 3, the rumble seat may be turned up and a container 40, serving as a market basket or utility container, can be inserted between the straddle seat and the back of the rumble seat, the bottom of the container resting upon the top of the rear cross brace 23.

Fig. 4 shows the straddle seat unit moved to its rearward position. This arrangement is availed of when it is desired to use the vehicle as a stroller for one child. By placing the straddle seat in the position shown in Fig. 4, the weight of the child is distributed on the wheels to facilitate easier steering and negotiation of curbs.

To use the vehicle as a baby-walker, the propulsive handle and floor-pan are detached and the straddle seat preferably is placed in the rearward position. It will be understood that the height of the seat above the surface supporting the vehicle is such that a child straddling the forward portion or straddle-board of the seat can reach such surface with his feet to propel the vehicle in the usual manner.

From the foregoing description, it will be apparent that the present invention provides a very sturdy, handsome and convenient child's vehicle, readily convertible from walker to stroller; that is provides a relatively inexpensive device having a frame constructed in large measure from pipe stock by simple bending and welding operations; that it is adaptable for one or two children; and that it provides convenient space for a utility container. The absence of sharp corners, achieved through the use of bent pipe, is advantageous in minimizing accidental injury or damage to the garments of children using the vehicle, or to the garments of a person propelling the vehicle, as well as injury to the children themselves.

Obviously, the invention is not restricted to the particular embodiment thereof herein shown and described. Moreover, it is not indispensable that all the features of the invention be used conjointly, since they may be employed advantageously in various combinations and sub-combinations.

What is claimed is:

1. A child's vehicle which comprises, in combination, a chassis including a pair of elevated, longitudinal side members; a pair of caster wheels supporting the front of said chassis; a pair of wheels supporting the rear of said chassis; a straddle seat removably supported upon said side members, said seat being positioned at such a height above the surface supporting vehicle that a child straddling the seat may have his feet reach said surface comfortably; means for removably locking said seat to said side members in a forward position and in a rearward position; a propulsive handle removably affixed to said vehicle; and a floor-pan removably supported by said vehicle beneath said seat upon which a child straddling the seat may rest his feet when the pan is in supported position.

2. A child's vehicle which comprises, in combination, a chassis including a pair of elevated, longitudinal side members; a pair of caster wheels supporting the front of said chassis; a pair of wheels supporting the rear of said chassis; a straddle seat removably supported upon said side members; means for removably locking said seat to said side members in a forward position and in a rearward position, said locking means including pins carried by said side members, complementary openings formed in said seat, and resiliently mounted clamping means carried by said seat and engaging said side members; a propulsive handle removably affixed to said chassis; and a floor-pan removably supported by said chassis beneath said seat upon which a child straddling the seat may rest his feet when the pan is in supported position.

3. A child's vehicle which comprises, in combination, a chassis including a pair of elevated, longitudinal side members; a pair of caster wheels supporting the front of said chassis; a pair of wheels supporting the rear of said chassis; a straddle seat removably supported upon said side members; means for removably locking said seat to said side members in a forward position and in a rearward position, said locking means including pins carried by said side members, complementary openings formed in said seat, and resiliently mounted clamping means carried by said seat and engaging said side members; a transverse rumble seat mounted on said side members rearwardly of said straddle seat; a propulsive handle removably affixed to said chassis; and a floorpan removably supported by said chassis beneath said seats upon which a child occupying either of said seats may rest his feet when the pan is in supported position.

4. A wheeled unit of the character described comprising, in sub-combination, a chassis including: a bed comprising a single length of tubular stock having longitudinal, parallel side portions, a rear portion interconnecting said side portions, the ends of said length of stock depending vertically as a continuation of the forward parts of said side portions to form front legs, a forward tubular cross member between said front legs, a pair of tubular rear legs depending from the rear parts of said side portions, and a rear half-tubular cross member between said rear legs; a caster wheel supporting each of said front legs; and rear wheels supporting said rear legs.

GARY C. BRECKNER.
ELLIOTT F. ROBINSON.

REFERENCES CITED

The following references are of record in the file of this patent:

UNITED STATES PATENTS

| Number | Name | Date |
|---|---|---|
| 91,453 | Knell | June 16, 1869 |
| 1,952,467 | Slee | Mar. 27, 1934 |
| 1,872,216 | Appleby | Aug. 16, 1932 |
| 1,100,264 | Sitler | June 16, 1914 |
| D. 139,329 | Peltier | Oct. 31, 1944 |
| 1,147,191 | Rundle | July 20, 1915 |
| 2,375,389 | Shuler | May 8, 1945 |
| 1,167,439 | Siebert et al. | Jan. 11, 1916 |
| 802,249 | White | Oct. 17, 1905 |
| 1,741,014 | Debelack | Dec. 24, 1929 |
| 1,149,972 | Zumino | Aug. 10, 1915 |
| 1,468,175 | Sherwood | Sept. 18, 1923 |
| 382,009 | Robinson | May 1, 1888 |
| 1,872,216 | Appleby | Aug. 16, 1932 |